(12) United States Patent
Wen et al.

(10) Patent No.: US 11,023,004 B2
(45) Date of Patent: Jun. 1, 2021

(54) HEAD-MOUNTED DISPLAY HAVING QUICK ASSEMBLY AND DETACHMENT DESIGN

(71) Applicants: STARVR CORPORATION, New Taipei (TW); Acer Incorporated, New Taipei (TW)

(72) Inventors: Chun-Hung Wen, New Taipei (TW); Chun-Hsien Chen, New Taipei (TW); Chi-Tai Ho, New Taipei (TW); Kuan-Lin Chen, New Taipei (TW)

(73) Assignees: STARVR CORPORATION, New Taipei (TW); Acer Incorporated, New Taipei (TW)

( * ) Notice: Subject to any disclaimer, the term of this patent is extended or adjusted under 35 U.S.C. 154(b) by 0 days.

(21) Appl. No.: 16/425,963

(22) Filed: May 30, 2019

(65) Prior Publication Data

US 2019/0369660 A1 Dec. 5, 2019

(30) Foreign Application Priority Data

Jun. 1, 2018 (TW) .................................. 107118975

(51) Int. Cl.
*G06F 1/16* (2006.01)
(52) U.S. Cl.
CPC ............ *G06F 1/163* (2013.01); *G06F 1/1679* (2013.01); *G06F 1/1681* (2013.01)
(58) Field of Classification Search
None
See application file for complete search history.

(56) References Cited

U.S. PATENT DOCUMENTS

| | | | |
|---|---|---|---|
| 7,484,646 B1 * | 2/2009 | Holmes | .................. B63C 11/12 224/181 |
| 9,635,450 B2 | 4/2017 | Drinkwater et al. | |
| 2004/0003453 A1 * | 1/2004 | Urakawa | ............ G02B 27/0176 2/422 |
| 2010/0327028 A1 * | 12/2010 | Nakabayashi | ......... A42B 1/247 224/162 |

(Continued)

FOREIGN PATENT DOCUMENTS

| | | |
|---|---|---|
| CN | 204188882 | 3/2015 |
| CN | 104698586 | 6/2015 |

(Continued)

*Primary Examiner* — David D Davis
(74) *Attorney, Agent, or Firm* — JCIPRNET

(57) ABSTRACT

A head-mounted display includes a head belt, a frame, a first locking element, a display assembly and a second locking element. The frame is connected to the head belt. The first locking element is disposed at the peripheral of the frame and includes a first locking portion and an unlocking portion adjacent to each other. The second locking element is disposed at the peripheral of the display assembly and includes a second locking portion. The display assembly is fixed to the frame by means of the second locking portion of the second locking element being locked to the first locking portion of the first locking element. The second locking portion is aligned with the unlocking portion, and the locking relation between the second locking portion of the second locking element and the first locking portion of the first locking element is released by the operation of the unlocking portion.

7 Claims, 4 Drawing Sheets

(56) References Cited

U.S. PATENT DOCUMENTS

| | | | | |
|---|---|---|---|---|
| 2012/0280007 A1* | 11/2012 | Nakabayashi | ..... | G02B 27/0176 224/181 |
| 2016/0062125 A1* | 3/2016 | Baek | ....... | G06F 1/163 361/679.01 |
| 2016/0216512 A1* | 7/2016 | Miller | ........ | G02B 27/0176 |
| 2016/0370590 A1* | 12/2016 | Fujishiro | ............ | G02B 27/0176 |
| 2020/0077181 A1* | 3/2020 | Tai | ........... | H04R 7/16 |

FOREIGN PATENT DOCUMENTS

| | | |
|---|---|---|
| CN | 105209953 | 12/2015 |
| CN | 105388615 | 3/2016 |
| CN | 105425397 | 3/2016 |
| CN | 206975319 | 2/2018 |
| CN | 206978933 | 2/2018 |
| TW | M491843 | 12/2014 |

* cited by examiner

HEAD-MOUNTED DISPLAY HAVING QUICK ASSEMBLY AND DETACHMENT DESIGN

CROSS-REFERENCE TO RELATED APPLICATION

This application claims the priority benefit of Taiwan application serial no. 107118975, filed on Jun. 1, 2018. The entirety of the above-mentioned patent application is hereby incorporated by reference herein and made a part of this specification.

BACKGROUND

Technical Field

The invention relates to a display device and more particularly, to a head-mounted display.

Description of Related Art

Virtual Reality (VR) refers to a technique for generating a three-dimensional (3D) virtual environment by utilizing computer simulation technology, thereby providing a user with sensory simulations in vision, smell or touch to experience vividness like being present in a real world. Generally, the user obtains an image in a 3D virtual environment via a head-mounted display. A commonly seen head-mounted display may be substantially divided into two major parts, i.e., a display assembly and a head belt, and the display assembly is usually pivoted to the head belt through a pivot structure. If the user wants to detach the display assembly from the head belt, he/she has to detach the aforementioned pivot structure first, which is inconvenient in the operation and time-wasting in the process. Further, if the head belt in the head-mounted display has to be used in common with others, problems with poor sanitation and hygiene may arise.

Thus, how to introduce a quick assembly/detachment mechanism to the head-mounted display for the user's convenient assembly/detachment of the display assembly and the head belt as well as keeping personal hygiene (for example, the user's personal head belt is allowed to be connected to another one's display assembly for being used in common) is really a part in an urgent need for the investment in development.

SUMMARY

The invention provides a head-mounted display which is convenient for a user to quickly wear while keeping personal hygiene.

A head-mounted display of the invention includes a head belt, a frame, a first locking element, a display assembly and a second locking element. The frame is connected to the head belt. The first locking element is disposed at the peripheral of the frame and includes a first locking portion and an unlocking portion adjacent to each other. The second locking element is disposed at the peripheral of the display assembly and includes a second locking portion, and the display assembly is fixed to the frame by means of the second locking portion of the second locking element being locked to the first locking portion of the first locking element. The second locking portion is aligned with the unlocking portion, and a locking relation between the second locking portion of the second locking element and the first locking portion of the first locking element is capable of being released by the operation of the unlocking portion.

To sum up, the display assembly of the head-mounted display of the invention is detachably assembled to the frame, such that a user can wear the head belt connected to the frame on the head and then lock the display assembly on the frame. Thus, the assembly is convenient and quick. On the other hand, because the head belt of the user is for personal use without being commonly used with others, thereby keeping personal hygiene.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, operated in cooperation with the description, serve to explain the principles of the invention.

DESCRIPTION OF DISCLOSED EMBODIMENTS

Figure 1:
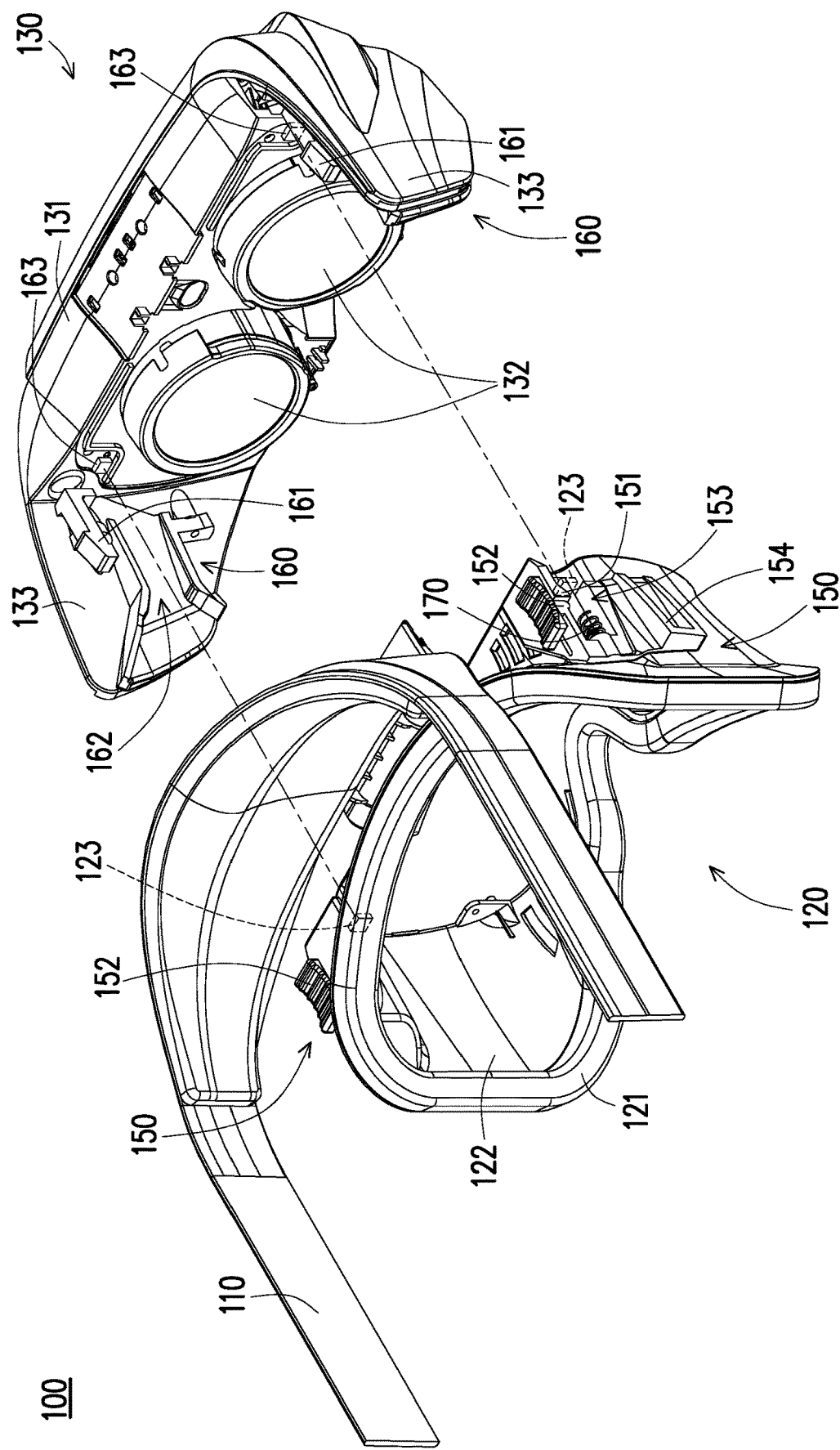
FIG. 1 is a schematic exploded diagram illustrating a head-mounted display according to an embodiment of the invention.
Figure 2:
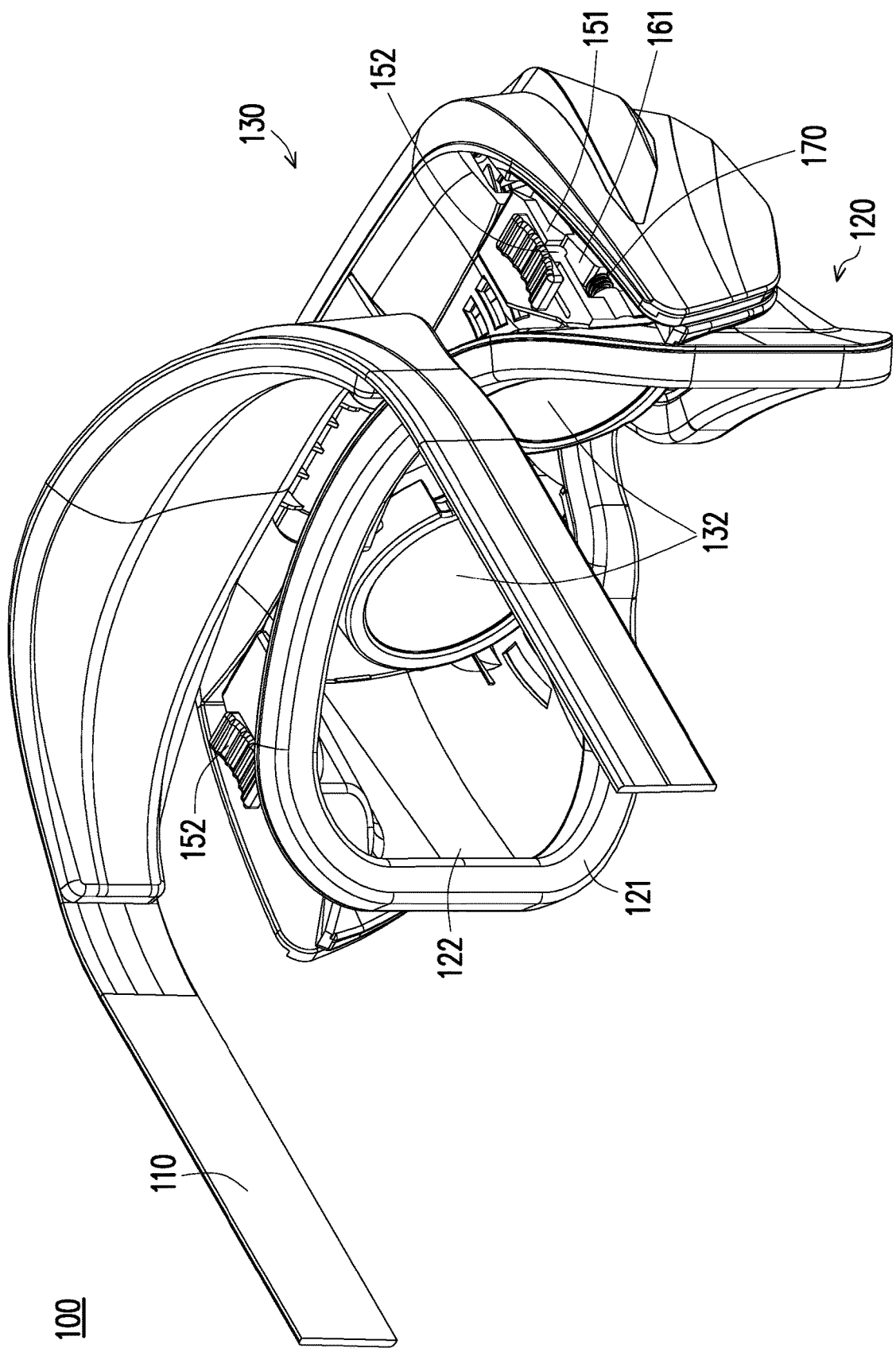
FIG. 2 is a schematic assembled diagram illustrating the head-mounted display according to an embodiment of the invention.
Figure 3:
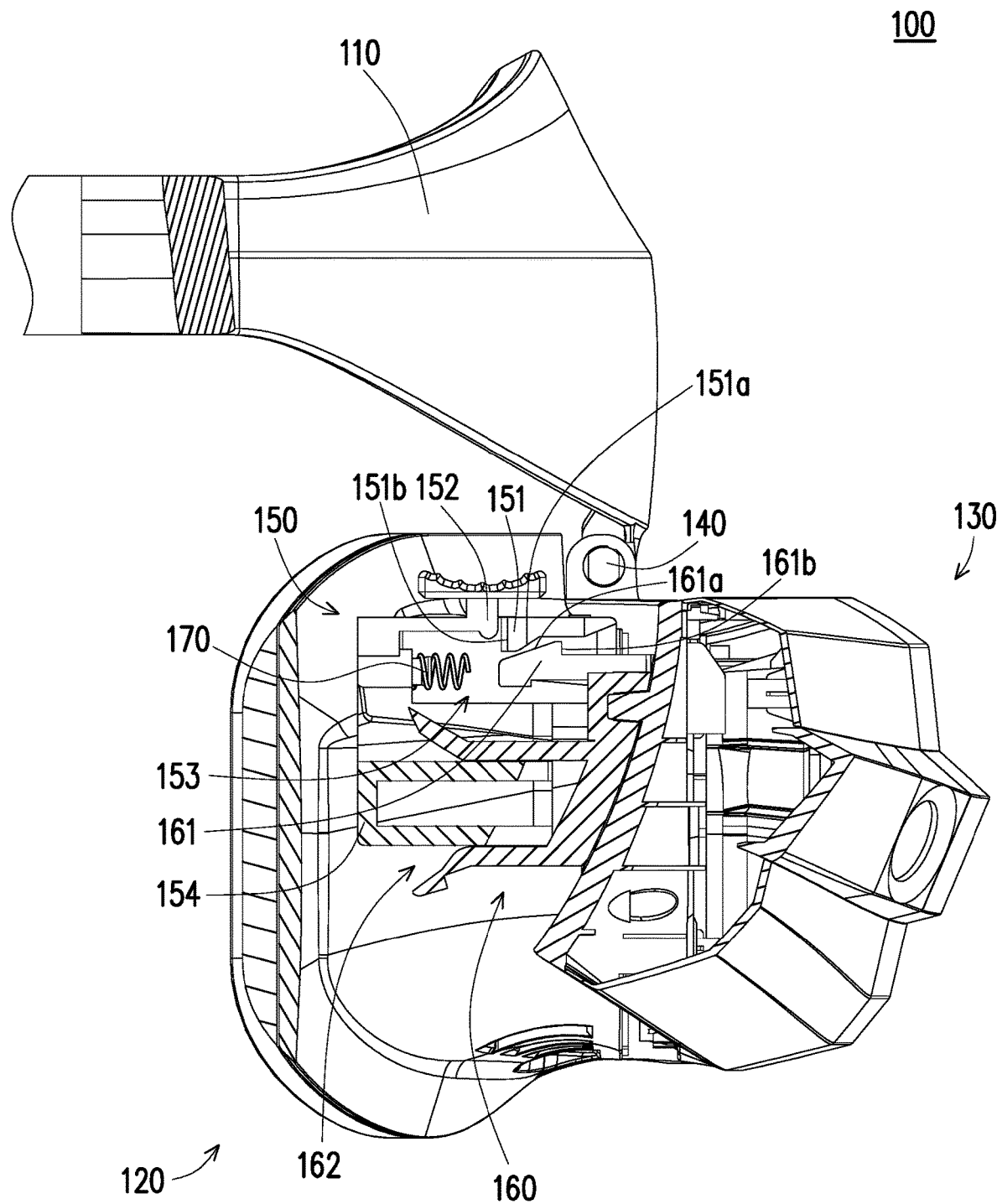
FIG. 3 and FIG. 4 are partial schematic cross-sectional diagram illustrating an assembly process of the head-mounted display according to an embodiment of the invention.
Figure 4:
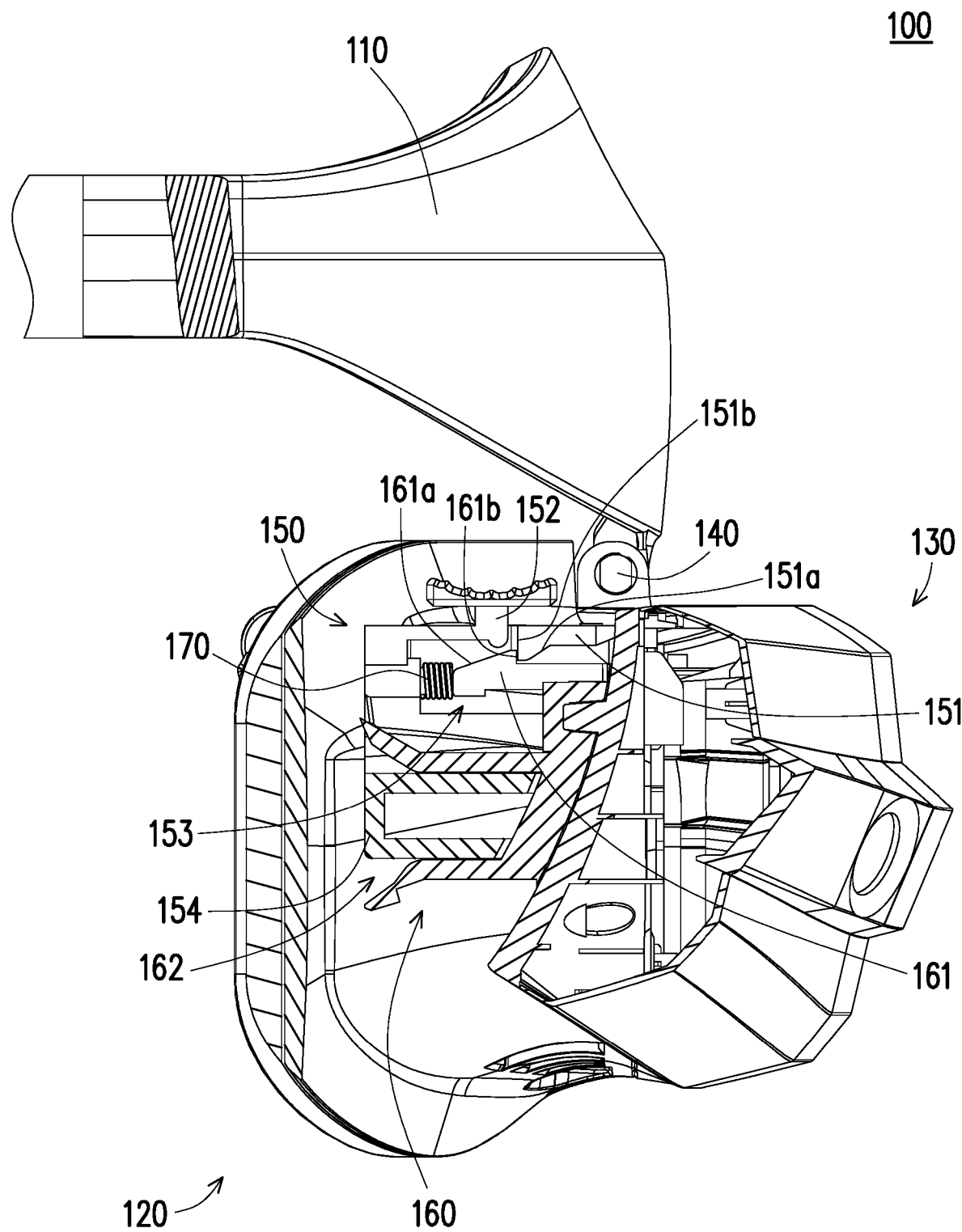

FIG. 1 is a schematic exploded diagram illustrating a head-mounted display according to an embodiment of the invention. FIG. 2 is a schematic assembled diagram illustrating the head-mounted display according to an embodiment of the invention. FIG. 3 and FIG. 4 are partial schematic cross-sectional diagram illustrating an assembly process of the head-mounted display according to an embodiment of the invention. Referring to FIG. 1 to FIG. 4, in the present embodiment, a head-mounted display 100 may be applied to a virtual reality (VR) and includes a head belt 110, a frame 120 connected to the head belt 110 and a display assembly 130. The frame 120 may be a hollow frame and pivoted to the head belt 110 through a hinge 140. The frame 120 may include a hollow supporting portion 121 and a hollow extending portion 122 connected to the hollow supporting portion 121. The hollow supporting portion 121 may be made of rubber, silicon or a material capable of being slip-resistant and adaptively deformed. When a user wears the head belt 110 on the head, the frame 120 is adhered to the face via the hollow supporting portion 121, thereby mitigating the user's discomfort and preventing the head-mounted display 100 from easily slipping from or falling off the user's head.

The display assembly 130 is detachably assembled on the frame 120. The display assembly 130 includes a host 131, a lens set 132 disposed on the host 131 and two host extending portions 133 extending outward from two opposite sides of the host 131. The lens set 132 is located in the hollow supporting portion 121 and the hollow extending portion 122 of the frame 120. Thus, when the host 131 projects light, the aforementioned light first passes through the lens set 132 and is refracted, and the refracted light passing through the hollow extending portion 122 and the hollow supporting portion 121 is transmitted to the user's eyes, without being shielded by the frame 120.

When the head-mounted display 100 further includes a first locking element 150 and a second locking element 160. The first locking element 150 is disposed at the peripheral of the frame 120, and the second locking element 160 is disposed at the peripheral of the display assembly 130. The second locking element 160 is configured to be operated in cooperation with the first locking element 150 for the user's convenient assembly/detachment of the frame 120 and the display assembly 130. Based on the quick assembly/detachment design of the display assembly 130 and the frame 120, the display assembly 130 and the frame 130 may be provided for use in common, while the user's head belt 110 is for personal use without being shared with others, thereby keeping personal hygiene.

In the present embodiment, the number of the first locking element 150 is two, and the two first locking elements 150 are respectively disposed at two opposite sides of the hollow extending portion 122. The number of the second locking element 160 is two, and the two second locking elements 160 are respectively disposed at the two host extending portions 133. Further, each of the first locking elements 150 is disposed outside the hollow extending portion 122, and each of the second locking elements 160 is disposed inside the corresponding host extending portion 133. Because a width of the display assembly 130 is greater than a width of the frame 120, after the display assembly 130 is assembled on the frame 120, each of the host extending portions 133 covers the outside of the corresponding hollow extending portion 122, and each of the second locking elements 160 is locked to the first locking element 150. With the two sets of first locking elements 150 and second locking elements 160 which are symmetrically disposed, it contributes to enhancing convenience and reliability in assembling of the display assembly 130 and the frame 120.

It should be specially mentioned that the numbers of the first locking elements 150 and the second locking elements 160 may be adjusted based on design requirements, but the two numbers have to match each other. Additionally, according to a design requirement, where the width of the display assembly 130 is designed to be smaller than the width of the frame 120, for example, the first locking elements 150 may change to be disposed inside the hollow extending portion 122, and the second locking elements 160 may change to be disposed outside the host extending portions 133.

As the two sets of first locking elements 150 and second locking elements 160 have the same structure design and assembly/detachment principle, description related to only one of the sets of the first locking elements 150 and the second locking elements 160 will be set forth below, and will not be repeated. Continuously referring to both FIG. 1 to FIG. 4, in the present embodiment, the first locking element 150 includes a first locking portion 151 and an unlocking portion 152 adjacent to each other, wherein the first locking portion 150 and the unlocking portion 152 are separate from each other, and the unlocking portion 152 may be deformed by a force. On the other hand, the second locking element 160 includes a second locking portion 161. In a state as illustrated in FIG. 4, the display assembly 130 is fixed to the frame 120 by means of the second locking portion 161 of the second locking element 160 being locked to the first locking portion 151 of the first locking element 150. Because the first locking portion 151 leans against the second locking portion 161, and the first locking portion 151 blocks at least a part of a moving-out path of the second locking portion 161, the second locking element 160 may be prevented from being detached from the first locking element 150 easily due to an external force.

After the second locking element 161 is locked to the first locking element 151, the second locking portion 161 is aligned with the unlocking portion 152. When the user wants to detach the frame 120 from the display assembly 130, the user may apply a force to press a button on the unlocking portion 152, thereby moving the unlocking portion 152 to push the second locking portion 161. In this circumstance, the second locking portion 161 being pushed is elastically deformed to move away from the first locking portion 151, thereby releasing a locking relation between the second locking element 161 and the first locking element 151. After releasing the locking relation between the second locking element 161 and the first locking element 151, the user then may detach the frame 120 from the display assembly 130.

In the present embodiment, the head-mounted display 100 further includes an elastic element 170. The elastic element 170 is disposed on the first locking element 150 and may use a compression spring. The elastic element 170 is disposed side by side with the unlocking portion 152 and is pressed by the second locking portion 161 to be elastically deformed, as illustrated in FIG. 4. Meanwhile, an elastic returning force of the elastic element 170 in a compressed state is applied to the second locking portion 161, it is employed to drive the second locking portion 161 to firmly lean against the first locking portion 151, so as to prevent the frame 120 and the display assembly 130 from loosing off or floating. On the contrary, after the locking relation between the second locking element 161 and the first locking element 151 is released, the elastic returning force of the elastic element 170 may drive the second locking portion 161 to move relative to the first locking portion 151, so as to prevent the second locking element 161 from elastically returning and being again locked to the first locking element 151.

Referring to FIG. 3, the first locking portion 151 has a first forward surface 151a and a first stop surface 151b connected to the first forward surface 151a, and the second locking portion 161 has a second forward surface 161a and a second stop surface 161b connected to the second forward surface 161a. During the process of the second locking portion 161 being locked to the first locking portion 151, the second forward surface 161a first moves through and leans against the first forward surface 151a, such that the first locking portion 151 and the second locking portion 161 are elastically deformed. After the second forward surface 161a moves through the first forward surface 151a, the elastically returning first locking portion 151 is locked to the second locking portion 161, and the second locking portion 161 leans against the first stop surface 151b of the first locking portion 151, with the second stop surface 161b, as illustrated in FIG. 4.

In the state as illustrated in FIG. 4, the first forward surface 151a and the second forward surface 161a are respectively located at two opposite sides of the first stop surface 151b and the second stop surface 161b, and the unlocking portion 152 is aligned with the second forward surface 161a. Thus, the unlocking portion 152 which is moved by the force pushes the second stop surface 161b, such that the second locking portion 161 is elastically deformed. In the meantime, the second stop surface 161b is relatively separated from the first stop surface 151b, thereby releasing the locking relation between the second locking element 161 and the first locking element 151. After releasing the locking relation between the second locking element 161 and the first locking element 151, the user then may detach the frame 120 from the display assembly 130.

Furthermore, the first forward surface 151*a* and the second forward surface 151 may be bevel surfaces, such that smoothness for locking or unlocking the first locking portion 151 and the second locking portion 161 may be increased. On the other hand, the first stop surface 151*b* and the second stop surface 161*b* may be vertical surfaces. For example, a detaching direction of the frame 120 is vertical to a detaching direction of the display assembly 130. Thus, in a condition that the leaning relation between the first stop surface 151*b* and the second stop surface 161*b* is not released, it is not easy to separate the frame 120 from the display assembly 130 by the elastic returning force of the elastic element 170 or any other force.

Referring to FIG. 1, FIG. 3 and FIG. 4, in the present embodiment, the first locking element 150 further includes a guide structure, which may use a slide slot 153 and is configured to guide the second locking portion 161. On the other hand, the first locking portion 150 and the unlocking portion 152 are located at the same side of the slide slot 153, and the elastic element 170 is disposed in the slide slot 153, such that the disposition space may be much less wasted. During the process of the frame 120 being assembled to the display assembly 130, the second locking portion 161 enters the slide slot 153 from an opening thereof and moves toward the bottom of the slide slot 153, so as to lean against the elastic element 170 disposed in the slide slot 153. On the contrary, during the process of the frame 120 being detached from the display assembly 130, the second locking portion 161 may be pushed by the elastic returning force of the elastic element 170 or any other force, so as to be ejected from the opening of the slide slot 153. Namely, the slide slot 153 operated in cooperation with the second locking portion 160 may be employed to determine the detaching directions of the frame 120 and the display assembly 130 for the user's convenient assembly/detachment of the frame 120 and the display assembly 130.

In order to enhance the stability of the assembly/detachment of the frame 120 and the display assembly 130, the first locking element 150 further includes a first guide structure 154 disposed side by side with the slide slot 153. The second locking element 160 further includes a second guide structure 162 disposed side by side with the second locking portion 161. For instance, the first guide structure 154 may be a slide block, and the second guide structure 162 may be a slide slot. During the process of the frame 120 being assembled to the display assembly 130, the slide block (i.e., the first guide structure 154) enters the slide slot (i.e., the second guide structure 162) from an opening thereof and moves toward the bottom of the slide slot (i.e., the second guide structure 162), so as to lean against the bottom of the slide slot (i.e., the second guide structure 162). On the contrary, during the process of the frame 120 being detached from the display assembly 130, the slide block (i.e.m the first guide structure 154) may be pushed by the elastic returning force of the elastic element 170 or any other force to be ejected from the opening of the slide slot (i.e., the second guide structure 162). In other words, the first guide structure 154 operated in cooperation with the second guide structure 160 may be employed to determine the detaching directions of the frame 120 and the display assembly 130 for the user's convenient assembly/detachment of the frame 120 and the display assembly 130.

It should be specially mentioned that the manner in which the first guide structure 154 and the second guide structure 162 are operated in cooperation with each other is not limited to the above. For instance, the first guide structure 154 may change to be a slide slot, and the second guide structure 162 may change to be a slide block.

During the process of the frame 120 being assembled to the display assembly 130, in order to assist to position relative positions of the frame 120 and the display assembly 130, the first locking element 150 is aligned with the second locking element 160. The frame 120 may be disposed with a first magnetic member 123, and the display assembly 130 may be disposed with a second magnetic member 163. According to assembly directions of the frame 120 and the display assembly 130 and the cooperative operation manner of the first locking element 150 and the second locking element 160, a position where the first magnetic element 123 is located on the frame 120 and a position where the second magnetic element 163 is located on the display assembly 130 have to cross-refer to each other. In this way, when the frame 120 and the display assembly 130 are assembled to each other, the second magnetic element 163 is aligned with the first magnetic element 123, and the user is guided to assemble the frame 120 to the display assembly 130 by a magnetic attraction force between the first magnetic element 123 and the second magnetic element 163.

It should be specially mentioned that the number of the first magnetic element 123 is consistent with the number of the second magnetic element 163, wherein each of the numbers of the first magnetic element 123 and the second magnetic element 163 may be one or plural, which is not limited in the invention. On the other hand, the first magnetic element 123 and the second magnetic element 163 may be a combination of two magnets or a combination of a magnet and a magnetically attracted part, and the magnetic attraction force between the first magnetic element 123 and the second magnetic element 163 is designed based on a principle that the magnetic attraction force is not larger than the elastic returning force of the elastic element 170, thereby avoiding a situation that the second locking portion 160 is incapable of being pushed to move relative to the first locking portion 151 by the elastic returning force of the elastic element 170 due to the magnetic attraction force between the first magnetic element 123 and the second magnetic element 163 being too large.

In addition, based on the same or similar assembly/detachment principle, the first locking element 150 may change to be disposed on the display assembly 130, and the second locking element 160 may change to be disposed on the frame 120. Regarding the disposition manner described above, only the assembly/detachment directions of the frame 120 and the display assembly 130 have to be considered to adjust structure directions and relative positions of detailed structures in the first locking element 150 and structure directions and relative positions of detailed structures in the second locking element 160. In this way, the same technical effect of the embodiment described above may also be achieved.

Based on the above, the frame of the head-mounted display of the invention is pivoted to the head belt, and the first locking element and the second locking element are respectively disposed corresponding to the frame and the display assembly. The user can wear the head belt on the head and then fix the display assembly to the frame by means of the first locking element being locked to the second locking element. Thus, the assembly is convenient and quick. On the contrary, the user can separate the display assembly frame the frame only by means of releasing the locking relation between the first locking element and the second locking element. Based on the quick assembly/detachment design of the display assembly and the frame, the display assembly and the frame may be used in a universal manner, while the user's head belt is for personal use without being shared with others, thereby keeping personal hygiene.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A head-mounted display, comprising:
a head belt;
a frame, connected to the head belt;
a first locking element, disposed at the peripheral of the frame, wherein the first locking element comprises a first locking portion and an unlocking portion adjacent to each other;
a display assembly; and
a second locking element, disposed at the peripheral of the display assembly, and comprising a second locking portion, wherein the display assembly is fixed to the frame by means of the second locking portion of the second locking element being locked to the first locking portion of the first locking element, the second locking portion is aligned with the unlocking portion, and a locking relation between the second locking portion of the second locking element and the first locking portion of the first locking element is capable of being released by the operation of the unlocking portion, wherein the first locking portion has a first forward surface and a first stop surface connected to the first forward surface, the second locking portion has a second forward surface and a second stop surface connected to the second forward surface, and the first stop surface leans against the second stop surface, wherein the first forward surface and the second forward surface are respectively located at two opposite sides of the first stop surface and the second stop surface, and the unlocking portion is aligned with the second forward surface.

2. The head-mounted display according to claim 1, further comprising:
an elastic element, disposed on the first locking element, disposed side by side with the unlocking portion, and pressed by the second locking portion to be elastically deformed.

3. The head-mounted display according to claim 2, wherein the first locking element further comprises a guide structure configured to guide the second locking portion, the first locking portion and the unlocking portion are located at a side of the guide structure, and the elastic element is disposed on the guide structure.

4. The head-mounted display according to claim 1, wherein the first locking element further comprises a first guide structure, the second locking element further comprises a second guide structure disposed side by side with the second locking portion, and the first guide structure is coupled to the second guide structure.

5. The head-mounted display according to claim 1, wherein the frame is disposed with a first magnetic member, the display assembly is disposed with a second magnetic member, and the first magnetic member and the second magnetic member are aligned with and attracted by each other.

6. The head-mounted display according to claim 1, wherein the number of the first locking element is two, the number of the second locking element is two, the two first locking elements are respectively disposed at two opposite sides of the frame, and the two second locking elements are respectively disposed at two opposite sides of the display assembly.

7. The head-mounted display according to claim 1, further comprising:
a hinge, pivoted to the head belt and the frame.

* * * * *